J. F. LAMB & J. F. SMART.
SAD IRON.
APPLICATION FILED APR. 13, 1911.
1,073,806.  Patented Sept. 23, 1913.
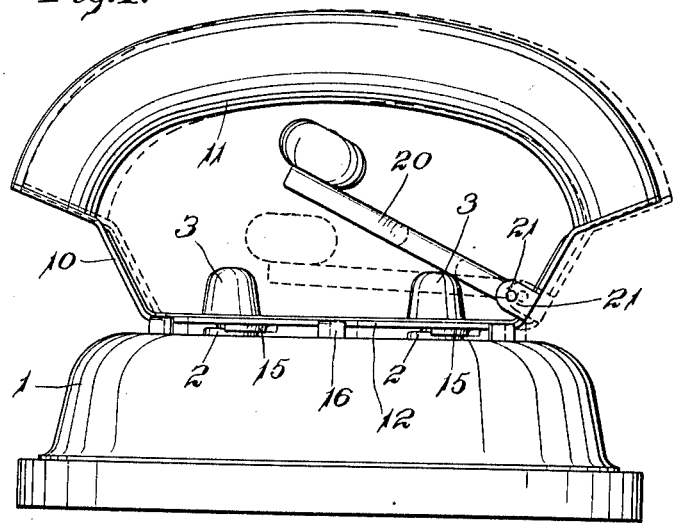
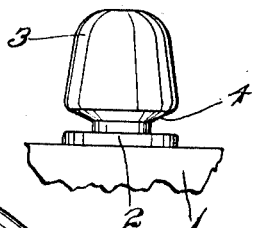
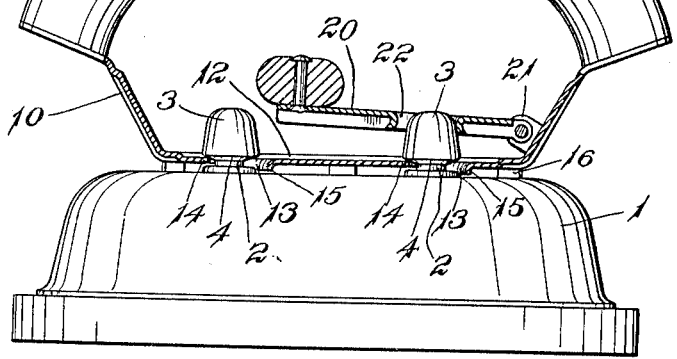
WITNESSES:
INVENTORS.
J. F. Lamb.
J. F. Smart.
BY
Their ATTORNEY.

UNITED STATES PATENT OFFICE.

JOSEPH F. LAMB AND JOSEPH F. SMART, OF NEW BRITAIN, CONNECTICUT, ASSIGNORS TO LANDERS, FRARY & CLARK, OF NEW BRITAIN, CONNECTICUT, A CORPORATION OF CONNECTICUT.

SAD-IRON.

1,073,806.  Specification of Letters Patent.  Patented Sept. 23, 1913.

Application filed April 13, 1911.  Serial No. 620,953.

*To all whom it may concern:*

Be it known that we, JOSEPH F. LAMB and JOSEPH F. SMART, citizens of the United States, and residents of New Britain, in the county of Hartford, State of Connecticut, have invented certain new and useful Improvements in Sad-Irons.

Our invention relates particularly to irons of the class having removable handles and consists of a novel form of handle and attaching means therefor.

In the drawings—Figure 1 is a side elevation of a sad iron made in accordance with our invention showing in full lines the position of the handle as it is applied to the iron and in dotted lines the position of the handle after it is locked in place. Fig. 2 is a central longitudinal section of the handle. Fig. 3 is a detail view, on enlarged scale, of one of the studs.

Referring to the drawings the numeral 1 denotes the iron, 2, 2 studs secured in the top thereof having tapering heads 3, 3, the undersides of which are downwardly inclined as indicated at 4, 4 and illustrated clearly in the enlarged view of Fig. 3.

10 is the handle comprising a grip 11 and a base 12. The latter is apertured as at 13, 13 to receive the heads of the studs, ledges 14, 14 being formed at one side of said apertures which are adapted to underlie and interlock with the stud heads.

The base 12 is held up away from the iron by lugs 15 formed at the apertures 13, 13 opposite the ledges 14, 14 and by the lugs 16, 16 formed at intervals along the edges of the base, providing for the free circulation of air and also properly positioning the ledges 14, 14 with respect to the stud heads; the lugs 15 being at the opposite sides of the apertures from the ledges 14, 14 perform the further function of preventing engagement of the base with the stud heads when the handle is being removed and also prevent sidewise movement of the handle on the base owing to the fact that they extend around on the sides of the studs as clearly seen in Fig. 1.

The means provided for shifting the handle longitudinally on the iron to cause the ledges 14, 14 to interlock with the stud heads, and to hold it in this position, consists of a lever 20 pivoted on a convenient part of the handle, as one of the base uprights 21, and having an aperture 22 which is above one of the apertures 13 in the base but slightly out of alinement therewith.

The aperture in the lever is at a greater distance from the fulcrum than the aperture in the handle, and in consequence when the handle is applied to the iron, the lever is held raised owing to the engagement of one wall of the aperture with the tapered head of one of the studs. If now, the handle is released the weight of the lever causes it to drop, the tapered head of the stud exerting a camming action on the lever so as to shift the whole handle laterally carrying the ledges 14, 14 under the stud heads. Both ends of the handle base are thus interlocked with the studs which are arranged near the ends of the iron and the handle cannot be disengaged from the iron without manually lifting the lever and shifting the whole handle so as to disengage the ledges from the stud heads.

The utility of the inclined undersides of the stud heads now becomes apparent. As the handle shifts longitudinally due to the camming action of one of the studs on the lever, the ledges are drawn under the stud heads and ride down the downwardly inclined surfaces which act to wedge the base firmly down onto the iron. In case of wear, or if it is desired to more firmly attach the handle to the iron, the lever can be pressed down manually which causes a still further longitudinal movement of the handle and a stronger wedging action tending to clamp the handle onto the iron.

By preference the handle base is made up out of sheet metal stamped to shape and suitably stiffened, the lugs being formed by drawing down the metal at the edges of the base and also by drawing down the metal around a portion of the wall of the apertures, the ears between which the lever is pivoted being folded over from one of the handle uprights. The lever is also formed up from sheet metal and preferably the walls of its aperture are drawn down to form a bearing surface of some considerable extent.

It is, of course, clear that the handle is reversible and for this reason we prefer to make the studs of cylindrical shape. It will also be noted that in applying the handle to the iron it is not necessary to touch the lever, the interlocking of the two parts occurring automatically.

It is clear that the form and construction of the various parts of this device can be altered and that the invention is susceptible of modifications and we desire to cover by the appended claims any and all such modifications as come within the spirit of the invention.

We claim as our invention:

1. In an article of the character described, an iron provided with a stud in the top thereof, a handle having a base apertured to receive said stud, and a gravity-operated device fulcrumed on said handle and constituting in coöperation with the head of said stud a common means for first engaging said handle with said stud, and next for locking the parts in engaging position.

2. In an article of the character described, an iron, a pair of studs mounted in the top thereof, a handle having a base apertured to receive said studs, interengaging parts on the handle-base and studs, and a gravity-operated device fulcrumed on said handle and constituting in coöperation with the head of one of said studs a common means for first engaging said handle with said studs, and then for locking the parts in engaging position.

3. In an article of the character described, an iron, a stud mounted thereon, a handle including a base apertured to receive said stud, and a gravity-operated lever fulcrumed on the handle, and having a face adapted to coöperate with said stud, the aperture in the base and the operative face of the lever being at different distances from the fulcrum point of the lever whereby said lever will first cause a longitudinal movement of the handle and its base to engage it with said stud and then lock the parts against accidental disengagement.

4. In an article of the character described, an iron, a stud mounted thereon, a handle comprising a base apertured to receive said stud, and a gravity-operated lever fulcrumed upon the handle and apertured to receive the stud, the aperture in the lever being at a greater distance from the fulcrum point of the lever than the aperture in the base of the handle.

5. In an article of the character described, an iron, a pair of studs mounted in the top thereof, a handle provided with a base apertured to receive the studs and which is shiftable longitudinally to cause the handle and studs to be engaged, and a gravity-operated lever fulcrumed on the handle and coöperating with one of said studs to first shift the handle into engaging position with the studs, and next to lock said handle in engaging position.

6. In an article of the character described, an iron, a plurality of headed studs mounted in the top thereof, said studs being transversely grooved, the upper walls of said grooves being downwardly inclined toward the center of the studs, a handle including a base, means for spacing said handle base from the top of said iron to bring it in alinement with the grooves in the studs, a gravity-operated lever fulcrumed on the handle and adapted to coöperate with one of said studs and constituting a common means to shift said handle and base longitudinally to engage it with said studs, and then to lock said parts in engaging position, said lever being manually operable to produce a further longitudinal movement of said handle and to cause the inclined walls of said grooves to exert a wedging action upon said base for the purpose set forth.

7. In an article of the character described, an iron, a pair of headed studs symmetrically arranged at the top thereof, a handle comprising a base and a grip attached thereto, said base having apertures to receive said studs, ledges at corresponding sides of said apertures adapted to interlock with the heads of said studs, walls of substantial depth formed at said apertures opposite the said ledges, a lever fulcrumed on said base and having an aperture arranged above one of the apertures in said base, but slightly out of alinement therewith, a wall of the aperture in said lever being adapted to coöperate with the head of either one of said studs for the purposes set forth.

8. In an article of the character described, an iron, a pair of headed studs symmetrically arranged at the top thereof near each end, a reversible handle comprising a base and a grip secured thereto, said base having lugs formed integrally therewith adapted to rest upon the top of said iron, and apertures through said base to receive the heads of said studs, a lever fulcrumed on said base and having an aperture located above one of the apertures in said base slightly out of alinement therewith, a wall of said aperture being adapted to coöperate with the head of either one of said studs for the purpose specified.

9. An iron comprising a body, a stud mounted thereon and having a groove, a handle provided with a base having an aperture adapted to receive the stud and a portion at the side of the aperture adapted to enter the groove of the stud, a lever fulcrumed upon the handle and having an aperture adapted to receive the upper portion of the stud and bear against the side of the same and by gravity move the base into and hold it in engagement with the groove in the stud.

10. An iron comprising a body, a stud mounted thereon and having a groove and a head, a handle having a base provided with an aperture, a lever fulcrumed on the handle and having an aperture passing through the same, the distance between the edge of the aperture through the lever at the point nearest the fulcrum and the edge of the aperture in the base farthest from the fulcrum being less than the diameter of the head of the stud whereby the base is held in engagement with the groove in the stud and the lever in engagement with the head of the stud.

JOSEPH F. LAMB.
JOSEPH F. SMART.

Witnesses:
 JACOB LOTZ,
 H. C. MOYARGAL.

Copies of this patent may be obtained for five cents each, by addressing the "Commissioner of Patents, Washington, D. C."